US012675272B2

(12) United States Patent
Cameron et al.

(10) Patent No.: US 12,675,272 B2
(45) Date of Patent: Jul. 7, 2026

(54) PROCESS FOR AUTOMATICALLY UPGRADING AN OPERATING SYSTEM ON A COMPUTER

(71) Applicant: Cristie Software Ltd, Stroud (GB)

(72) Inventors: Ian Cameron, Stroud (GB); Scott Sterry, Stroud (GB); James Reynolds, Stroud (GB); Jordan Stopford, Stroud (GB)

(73) Assignee: Cristie Software Ltd (GB)

( * ) Notice: Subject to any disclaimer, the term of this patent is extended or adjusted under 35 U.S.C. 154(b) by 227 days.

(21) Appl. No.: 18/203,077

(22) Filed: May 30, 2023

(65) Prior Publication Data

US 2023/0393838 A1 Dec. 7, 2023

(51) Int. Cl.
*G06F 8/65* (2018.01)

(52) U.S. Cl.
CPC ...................................... *G06F 8/65* (2013.01)

(58) Field of Classification Search
CPC .......................................................... G06F 8/65
See application file for complete search history.

(56) References Cited

U.S. PATENT DOCUMENTS

| | | | | | |
|---|---|---|---|---|---|
| 8,725,839 | B2 * | 5/2014 | Madduri | ................... | G06F 8/61 |
| | | | | | 709/219 |
| 9,031,548 | B2 * | 5/2015 | Mao | ..................... | H04W 24/00 |
| | | | | | 455/418 |

| | | | | | |
|---|---|---|---|---|---|
| 9,747,291 | B1 * | 8/2017 | Mall | ..................... | G06F 16/182 |
| 10,073,691 | B2 * | 9/2018 | Dake | .......................... | G06F 8/65 |
| 10,558,457 | B1 * | 2/2020 | Kolb | ......................... | G06F 8/65 |
| 10,824,412 | B2 * | 11/2020 | Gupta | ....................... | G06F 8/61 |
| 11,080,041 | B1 * | 8/2021 | Ah Kun | ............. | G06F 9/44505 |
| 12,153,912 | B2 * | 11/2024 | Sakuma | ................. | G06F 8/656 |
| 12,210,869 | B2 * | 1/2025 | Khan | .................... | G06F 11/366 |
| 2017/0192873 | A1 * | 7/2017 | Ozdemir | ................ | G06F 8/658 |
| 2018/0129492 | A1 | 5/2018 | Singh | | |
| 2020/0012970 | A1 * | 1/2020 | Srivastava | ............. | G06F 16/23 |
| 2020/0341746 | A1 * | 10/2020 | Mehra | ..................... | G06F 8/658 |
| 2020/0341749 | A1 * | 10/2020 | Bashi | .................... | G06F 3/0604 |
| 2022/0197770 | A1 * | 6/2022 | Tan | ........................... | G06F 8/65 |
| 2022/0317989 | A1 * | 10/2022 | Hettiwatte | ......... | G06F 9/44505 |
| 2023/0305871 | A1 * | 9/2023 | Chinnapatlolla | ......... | G06F 8/65 |

FOREIGN PATENT DOCUMENTS

CN 118647016 A * 9/2024

* cited by examiner

*Primary Examiner* — Francisco J Aponte
(74) *Attorney, Agent, or Firm* — Invention To Patent Services; Alex Hobson

(57) ABSTRACT

A method for automatically upgrading an operating system on a computer is provided. The method includes collecting system state information from the computer, and querying a knowledge base to identify state modification actions. Querying the knowledge base may include use of a classification algorithm, for example the k-nearest-neighbours algorithm, to identify non-exact matches in the knowledge base. The system is modified according to identified state modification actions and an upgrade is attempted. In the event that the upgrade fails, information from collected log files is used to update the knowledge base to propose further state modification actions, and the upgrade is attempted again.

18 Claims, 3 Drawing Sheets

PROCESS FOR AUTOMATICALLY UPGRADING AN OPERATING SYSTEM ON A COMPUTER

CROSS REFERENCE TO RELATED APPLICATIONS

This application claims the benefit of priority to Great Britain patent application No. GB 2208110.3, filed on Jun. 1, 2022; the entirety of which is hereby incorporated by reference herein.

BACKGROUND OF THE INVENTION

Field of the Invention

The present invention relates to a process and system for automatically upgrading an operating system on a computer, particularly to a learning system which learns mappings between operating system states and upgrade paths to reduce upgrade failures.

Background

Keeping operating systems up-to-date is a problem for IT departments in all modern businesses. Operating system upgrades are essential and often urgent—due to security, compliance and vendor support pressures, operating systems must be kept up-to-date. Upgrades are time consuming and systems may not be able to be used while a machine is in the process of upgrading.

Most importantly, upgrades do not always succeed. Operating system vendors provide upgrade installation programs which run on a system and upgrade it to a later version. However, the wide range of changes, modifications, configuration options and addons which may be in place in a working system means that the OS vendor's upgrade program will realistically only ever work on a subset of systems.

In particular, software running on the system may include software which has made changes to the operating system, or has required changes to be made to the operating system. Some or all of these changes may be unknown to the operating system's package manager. The operating system vendor's upgrade installation program may well fail on such a system.

It is therefore common for upgrades to fail. When this happens, a system administrator will typically try to find out why it has failed, and what needs to be changed to make it succeed. They do this using their own diagnostic knowledge, by searching documentation and the internet to see if there are known issues which may have caused the failure, and often by a certain amount of trial and error. Hopefully this process will lead them to make changes to the system which then allows the upgrade to succeed. However, it is a time-consuming and interactive process and can represent significant cost to a business.

In some cases (possibly after unsuccessful attempts to upgrade the OS in place) administrators will choose to avoid the upgrade process altogether, and instead provision a new system with a new operating system, and then make necessary configuration changes and migrate applications from the old system. Tools exist which assist with this process in various ways, including configuration management systems such as Chef, Puppet and Ansible which partly automate the process of configuring a system to receive an application. VirtaMove from App Zero can assist with migrating applications and settings from an old operating system to a new operating system. However, these alternatives to upgrading the operating system in place can lead to similar problems. A configuration management system requires upfront cost by requiring the configuration to be defined in advance. Migrating the application involves challenges in terms of identifying the components and settings which need to be moved.

"Rollback" technology is known. Various systems are available which one way or another allow an administrator to restore a previous "known good" state of a system. If an upgrade fails, the administrator may choose to roll back the system before making changes and trying again. This helps to provide a more controlled upgrade process since the administrator knows that they are starting from exactly the same state when they make a change to retry an upgrade. However, on their own these systems do not avoid the time-consuming work involved in upgrading an operating system.

It is an object of the present invention to reduce or substantially obviate the aforementioned problems. Particularly, it is an object of the invention to provide a system which can automate the process of upgrading an operating system with an improved chance of success.

SUMMARY OF THE INVENTION

According to the present invention, there is provided a method for upgrading an operating system on a computer system, the method comprising:
1. providing a knowledge base, the knowledge base including mappings from system states to sets of state modifications;
2. collecting data from the computer system to define the system state;
3. querying the knowledge base using the defined system state, the query returning a set of state modifications;
4. modifying the computer system according to the set of state modifications;
5. running an operating system upgrade program and collecting a log from the upgrade program;
6. testing whether the operating system upgrade completed successfully;
7. if the operating system upgrade did not complete successfully, examining the collected log, updating the knowledge base according to the log, and returning to step 3.

The method of the invention can provide an automated, unattended, operating system upgrade with a high success rate. By querying the knowledge base with system state information, modifications can be made automatically to increase the probability that the upgrade program will run successfully. In the event that the upgrade is not successful, information from collected log files may be used to update the knowledge base. Hence an adaptive learning system is provided which becomes more effective the more it is used.

The method sets out a sequence of the steps proceeded through in logical order. That is to say it may proceed through the steps in numerical order, from step 1 through to step 7, with conditional iterations through steps 3 to 7 until a success condition is reached.

If the testing shows that the operating system upgrade was completed successfully, the method may include the step up of updating the knowledge base according to the log. The updated to the knowledge based may include information about the success or failure of the upgrade and the set of modifications used according to the log. The automated process of updating the knowledge base advantageously ensure that it remains current since it mitigates against outdated recommendations.

In step 7, prior to returning to step 3, the knowledge base is updated. The updated knowledge base is then used for the new step 3. That is to say should the process of updating fail, i.e. reach step 7, the knowledge base is updated before the process starts to loop through step 3 to 6 or 7. At each start of each loop the knowledge base is updated based on the log produced from the previous loop, a set of state modification are returned based on the updated knowledge base. This iterative loop allows the method to quickly fixed failed updates while also ensuring that the knowledge base remains current and up to date.

The method for automatically upgrading an operating system on a computer system may be considered an automatic modify-and-retry upgrade action. In other words, when the upgrade fails, the upgrade process will automatically restart or loop back until a successful upgrade has been completed.

This allows the operating system upgrade to be run without any user interaction or user participation. User interaction is only required for electing to perform the upgrade and specifying a desired version of the operating system before the upgrade process is started. This allows for the automatic upgrade of the operating system without the need for external resources.

The modification of the computer system according to the set of state modifications enables the computer system to be compatible for the operating system upgrade thus increasing the probability that the upgrade program will run successfully.

The set of state of state modifications may include a set of actions that modify the computer system to a state in which it may be upgraded.

In addition, the set of state modifications may include a set of actions to apply the aforementioned modifications. Instructions may be provided in the form of code which many perform the actions.

The step of querying of the knowledge base preferably takes the form of using a classification algorithm, for example an unsupervised classification algorithm such as the k-nearest neighbours algorithm. This means that the exact system state detected does not have to be present in the knowledge base (which, given the very large number of possible system states, is actually very unlikely). The k-nearest neighbours algorithm has been found to be an effective way to classify the detected state according to close known states that are in the knowledge base, and output a set of state modifications according to the close known states. The set of state modifications thus identified will increase the probability of a successful operating system upgrade.

In such an embodiment, the knowledge base will typically contain state information which has been transformed into a format suitable for use with such unsupervised classification algorithms. For example, one type of state data may be service definitions, which can be stored as a table of service names, status (enabled, disabled, etc.), binary paths and settings.

The system state may include: applications installed, operating system and other settings, resources and resource allocations, running services, security permissions and any other parameters which define and affect the operation of a computer system.

In most embodiments, the system state information is collected using operating system APIs for querying this data.

In one embodiment this data is transformed into sparse matrices of numbers (either integer or floating point) which allow the k-nearest neighbours, and indeed a wide variety of other classification and/or machine learning algorithms, to be applied. One method of transforming state data into a suitable format is to use a hashing function to convert strings to integers and then to build a sparse matrix of the results using the primary key as the row offset.

A second knowledge base may be provided, the second knowledge base providing a mapping of log templates to sets of state modifications. The Applicant's co-pending application published as GB2589628 describes methods of analysing collected log files to identify particular features of interest. A "log template" can simply be considered to be a feature in a log—usually a feature which indicates an error or an anomaly.

In the event that the operating system upgrade fails, in step 7 above, the second knowledge base may be queried with one or more log templates identified in the collected log file(s). Again, the second knowledge base may not contain (indeed, may be unlikely to contain) an exact match for the particular set of log templates. An unsupervised classification algorithm such as k-nearest neighbours can again be used to classify the set of log templates identified according to close matches in the knowledge base, and return a set of state modifications.

The second set of state modifications returned from the query of the second knowledge base may be compared with the first set of state modifications identified and applied in steps 3 and 4. If the second set of state modifications contains modifications not present in the first set of state modifications, then an expanded set of state modifications (i.e. the union of the first and second sets) is added to the first knowledge base, mapped to the actual detected starting state of the system identified in step 2. The upgrade may then be performed again, after carrying out the expanded set of state modifications.

In this way, the first knowledge base is updated using information from log files, whenever an operating system upgrade fails. Not only is the information used to automatically try the upgrade process again on the system in question, but the first knowledge base will improve over time, and the classifier-based query system means that the system will improve with more knowledge.

The iterative nature of the upgrade process allows for the constant evolution of the query system. This thereby mitigates outdated upgrade recommendations.

Preferably, at least some of the state modifications are pairs of "do" and "undo" actions. The "do" action is carried out at step 4 in order to move the system to a state in which an upgrade is more likely to succeed. The corresponding "undo" action is then carried out once the system has been successfully upgraded, in order to more closely align the system with its original state and the state which the user, and application software, expects.

An example of a state modification may be a "do" action to disable virus protection software, and an "undo" action to enable virus protection software.

Configuration settings which affect the operation of the OS upgrade program may also be considered as state modifications, although this is an example of a state modification which does not need to have a corresponding "undo" action.

In some cases it may not be possible to automate either or both of the "do" or "undo" actions. In these cases the action can be considered as an instruction to an administrator to carry out a particular step. However, it is obviously preferable for as many actions as possible to be automated, for completely unattended operation.

The method of the invention may further comprise the step of carrying out a set of actions after the OS upgrade program has run. In some embodiments, this step may be carried out before the test for success or failure is made. In particular, success or failure may depend on whether the actions after the OS upgrade program has run can be successfully carried out, and therefore the success test cannot be run until the post-upgrade actions have been attempted. As an example, a post-upgrade action could include re-enabling a service which was disabled as part of the state modifications in step 4. If the service will not start on the upgraded system, then the upgrade may be considered as failed, despite the fact that the OS upgrade program in itself has completed successfully.

In some embodiments, the step of carrying out actions after the OS upgrade program has run may include the sub-steps of collecting data from the computer system to define the system state after the OS upgrade program has been run, comparing the collected post-upgrade state with the original state information collected in step 2, and then preparing and executing a state reversion plan to revert the system to its original state.

In typical embodiments however, failures to rebuild state exactly are not considered fatal to the process but will be reported to the user.

The first and/or second knowledge bases may be initially created by the manual input of a skilled administrator. Initially at least some non-working system states will have to be identified and mapped to sets of modifications which move the system into a working (i.e. upgradable) state. It is envisaged that the initial knowledge bases may be packaged and distributed as part of a product to a wide number of administrators who can then use the initial knowledge to automate upgrades within their own organisations. Preferably, feedback information from many users/purchasers of this product can be fed back to update a central knowledge base which all users can access. However in some use cases users may prefer, for security, compliance and/or connectivity reasons, not to feed back their information to a central knowledge base, in which case their copy of the knowledge base will update and develop separately, based on the failed upgrades and knowledge updates within their own installation.

Note that the knowledge base will also contain mappings of working system states to empty sets of modifications. This knowledge about what works, as well as what does not work, will result in a better output from the classifier to move a system more reliably to a state in which it can be upgraded.

Preferably, a snapshot and rollback system is provided. A snapshot of the system may be taken, preferably before the modifications are applied in step 4, although alternatively or additionally it may be preferable in some embodiments to take a snapshot after the modifications are applied but before the upgrade program is run in step 5. In the event of a failed upgrade, the system may be rolled back to the point when the snapshot was taken. This avoids any unknown effects of the failed upgrade process persisting on the system.

The system being upgraded may be a virtualised computer system or a physical computer system. Virtualised systems usually include VM-level snapshot capabilities. Physical machines can have snapshot capability added by rebooting them to a hypervisor layer and saving changed data to secondary storage. An example of this kind of system is sold by the Applicant as the Cristie Enhanced Testing System.

In a simple embodiment, the test as to whether the operating system upgrade completed successfully will simply be a test as to whether the operating system upgrade program reports a successful upgrade result. More complex embodiments may consider the upgrade problem more holistically, i.e. to measure success by the operating system having been upgraded and also all application software on the system continuing to function correctly. In such an embodiment state modifications may be considered to be modifications to both the starting state of the system and to the upgrade plan in terms of actions (not necessarily exactly paired "do" and "undo" actions) to be taken both before and after the upgrade program runs.

The numbered steps described may be referenced with either Roman numerals (e.g. iii, etc.) or western Arabic numerals (e.g. 1, 2, 3 etc.). These should be considered synonymous with each other and interchangeable.

BRIEF DESCRIPTION OF SEVERAL VIEWS OF THE DRAWINGS

For a better understanding of the present invention, and to show more clearly how it may be carried into effect, reference will now be made by way of example only to the accompanying drawings, in which.

DETAILED DESCRIPTION OF THE ILLUSTRATED EMBODIMENTS

In an example embodiment, a knowledge base is initially created by the manual action of a skilled administrator. It is envisaged that this initial "priming" action would be done centrally, and the result then distributed as part of a product.

The skilled administrator performs operating system upgrades on different machines. These upgrades will often succeed and, if so, the system state associated with the machine is mapped to an empty set of modifications, and the mapping is added to the knowledge base.

Sometimes, the upgrade will fail. In this case, the skilled administrator will examine log files to look for anomalies. Note that tools may be helpful in this process, for example the anomaly detection system described in GB2589628. The skilled administrator will try to identify a log template corresponding to the failure, and come up with a state modification which will correct the failure. The mapping of the log template to the modification is added to the second knowledge base.

For example, the log file may reveal a service which is preventing the upgrade from succeeding. The administrator may create a mapping from the relevant log template to a modification which takes the form of disabling the service.

"Failed to upgrade service < > due to conflicting resource constraints", "ServiceName"→DisableService ServiceName The above mapping, from a log template to an action, is added to the second knowledge base. The first knowledge base is also updated, to map the overall state of the system to the action "DisableService ServiceName".

The first and second knowledge bases are built up in this way, with knowledge of both successful and unsuccessful operating system upgrades. The first and second knowledge bases can then be distributed as part of a system for automating upgrades. Preferably, the knowledge bases are provided online and are constantly updated by feedback from multiple customer organisations.

Figure 1:
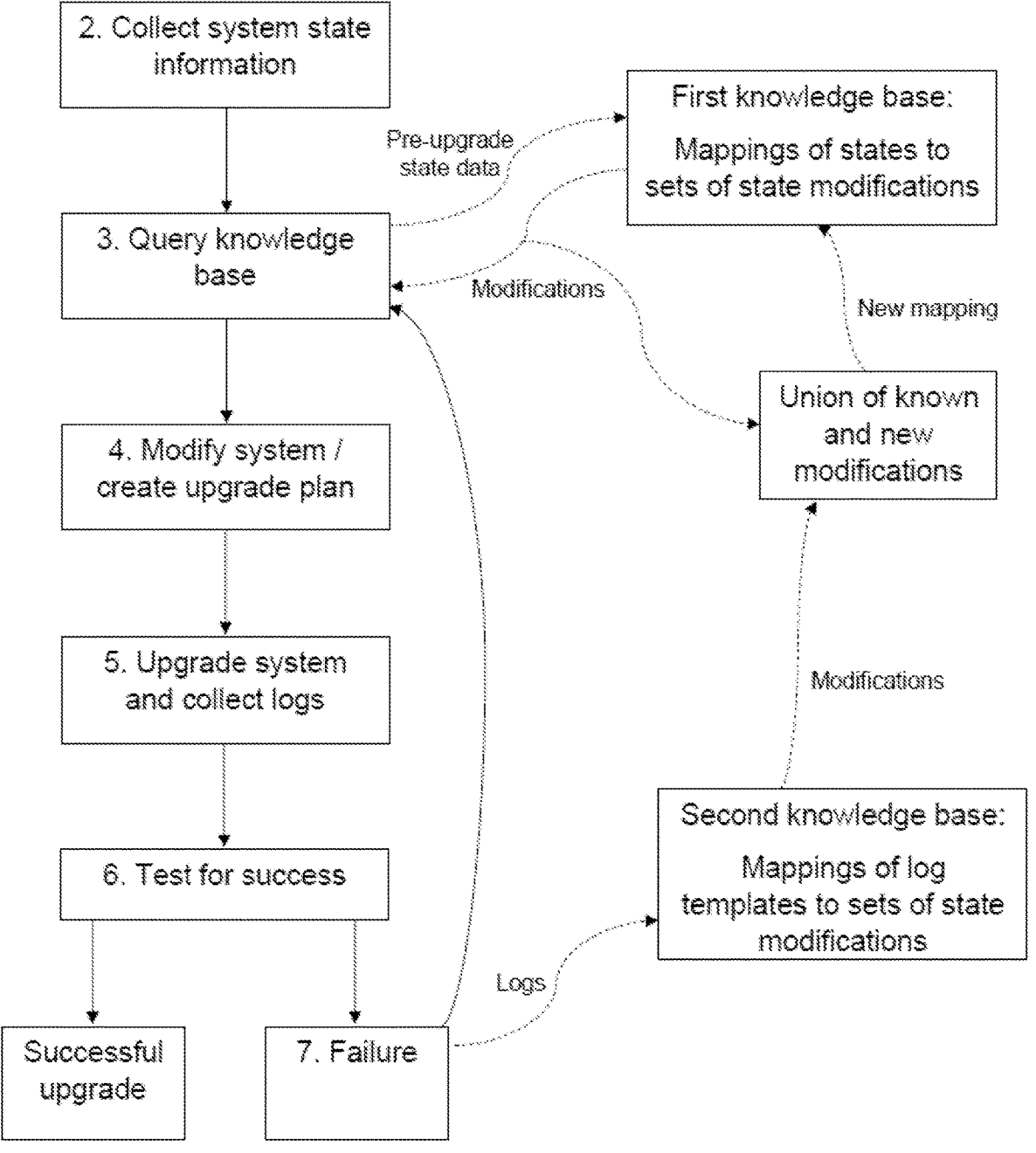
FIG. 1 is a diagram showing the operation of a method and system according to the invention.

Once the knowledge bases have been provided, the system may be used as will be described with reference to FIG. 1.

In step 2 system state information is collected. This may include for example running processes, security permissions, resource allocations, configuration settings, and so on. In principle as much information as possible about how the system is set up is collected. This is done using operating system APIs.

The state information may need to be transformed into a format suitable for use in querying the knowledge base. For example, the state information may be transformed using hashing to a sparse numerical matrix. In step 3 the state information is used to query the first knowledge base. The first knowledge base contains mappings of states to sets of state modifications. The result of the query will therefore be a set of state modifications. The query step involves use of a classification algorithm, for example k-nearest neighbours. The query should therefore return a result even in the (fairly likely) scenario that the first knowledge base does not contain an entry matching the system state exactly.

In step 4 the system is modified ready for the upgrade to take place. Note that in some embodiments, modifications can be taken to extend to configurations or options in the upgrade program itself, and may also include actions to take post-upgrade. Modifying the system can therefore be considered more generally as creation of an upgrade plan.

In step 5, the operating system upgrade program is run. A log file is collected.

In step 6 a check is made as to whether the upgrade was successful or not. Note that in some embodiments multiple checks may take place along a multi-step upgrade plan. Typically, whenever any step fails the upgrade will abort and the failure steps will take place. In some embodiments parts of the upgrade plan may be considered critical, and if those parts cannot complete then the upgrade will be considered a failure. If the operating system upgrade program fails then this will almost always be considered a critical failure. However other parts of the upgrade plan may be considered less critical. For example, a failure to re-enable a service after the upgrade program is completed may be reported to the user, and information about the failure may be used to update the knowledge base. However, as a non-critical failure it would not necessarily be used to automatically trigger a rollback and another upgrade attempt, since relatively straightforward manual action could potentially get the upgraded system working properly.

In the event of a failure, however it is defined, log files will be automatically examined. Log templates representing failures can be identified, for example according to the disclosure in GB2589628. The second knowledge base may be queried to identify a set of state modifications. These state modifications may then be combined with the original set of state modifications, and then added to the first knowledge base as a mapping associated with the pre-upgrade system state.

The upgrade may then be attempted again, now that the knowledge base has been improved. Potentially this may be iterated multiple times, terminating either on a successful upgrade, or if the query of the second knowledge base does not yield any state modification which was not already tried.

Figure 2:
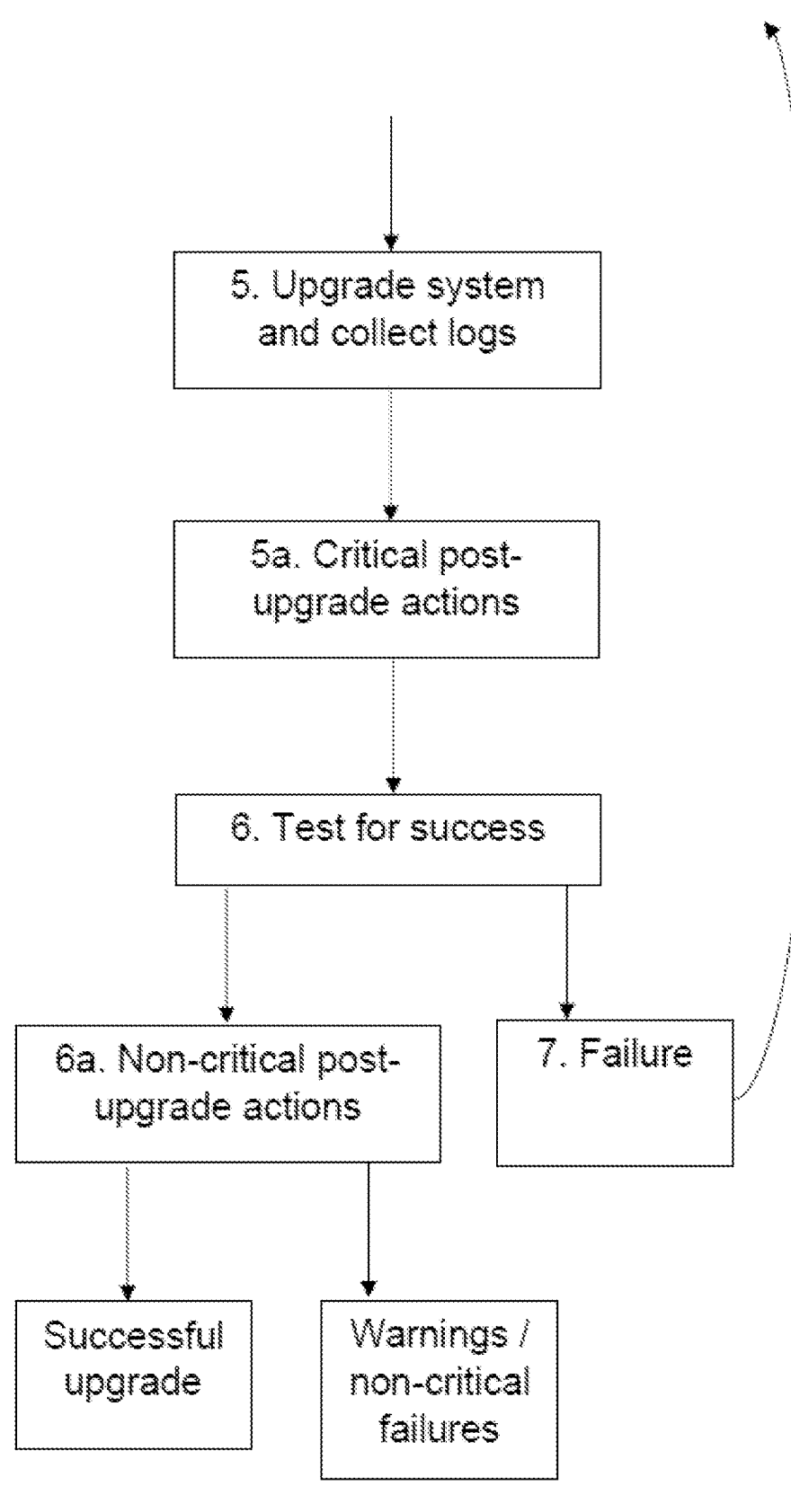
FIG. 2 is a diagram showing in more detail post-upgrade actions which may be taken in some embodiments.

In FIG. 2, a more detailed process is shown in which post-upgrade actions are taken. Post-upgrade actions typically include "undo" actions to return the system to the state it was in before it was modified to allow the upgrade to take place. In this embodiment, actions are divided into "critical" and "non-critical". The difference is that critical actions are treated as part of the upgrade (although not part of the OS upgrade program), and so a failure of a critical action will count as a failure of the upgrade and trigger an automatic update of the knowledge base and a re-attempt to plan and execute the upgrade. Non-critical actions, on the other hand, will be attempted automatically but, if they fail, the user is warned but the system is not automatically reverted for another upgrade attempt. In many embodiments, all post-upgrade actions outside of the OS vendor's upgrade program may be considered non-critical.

Figure 3:
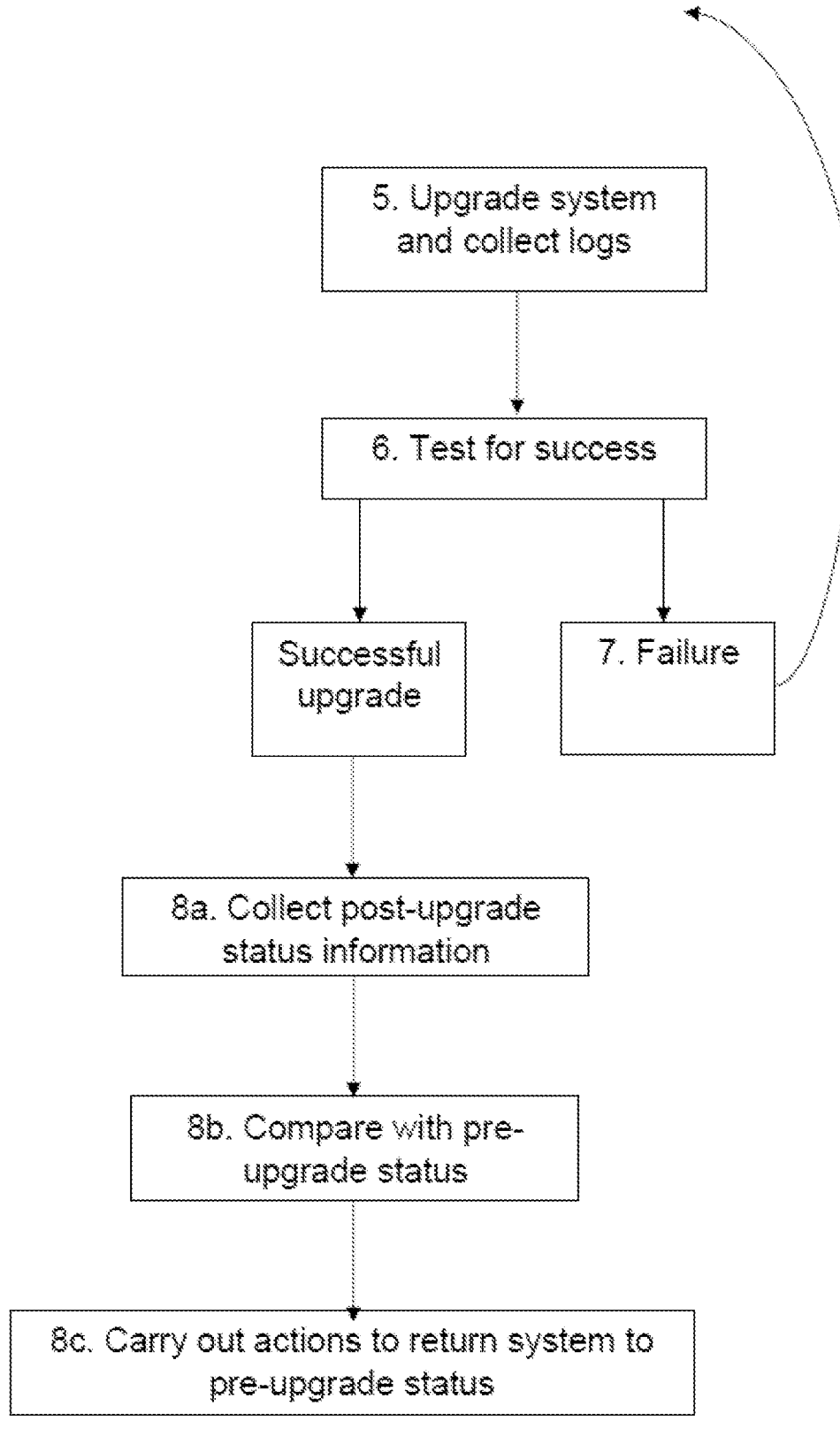
FIG. 3 is a diagram showing a further post-upgrade state comparison process which may be carried out in some embodiments.

Typically, the post-upgrade actions are "undo" actions derived from the "do and "undo" action pairs in the set of state modifications returned from the knowledge base query. In addition, or instead, a successfully upgraded system may be examined to determine if there are any differences from the starting system state. This process is illustrated in FIG. 3. In step 8a, after the system has been successfully upgraded, status information is collected again (i.e. the same process is carried out on the post-upgrade system as was carried out on the pre-upgrade system in step 2). The post-upgrade status information is then compared with the pre-upgrade status information in step 8b. If there are any differences, then a plan is made and executed to carry out actions to move the system back to its pre-upgrade state.

These steps, 8a, 8b and 8c may be carried out in addition to post-upgrade actions which have been scheduled as part of the upgrade plan. For example, in most embodiments many state modifications will have "do" and "undo" pairs to, for example, re-enable a disabled service or restore a changed security permission. However, the added steps 8a, 8b, 8c serve as a check that the system is in the right state, and take account of any unexpected effects of the operating system upgrade program, which may for example restore some system defaults.

Embodiments of the method and system of the invention assist with upgrading computer systems to new operating system versions, in a highly automated way requiring minimal manual intervention. The invention increases the probability that an upgrade will be successful, and avoids the need for time-consuming re-provisioning and re-building of systems. Embodiments may work successfully even with old, poorly documented and undocumented systems.

The embodiments described above are provided by way of example only, and various changes and modifications will be apparent to persons skilled in the art without departing from the scope of the present invention as defined by the appended claims.

What is claimed is:

1. A method of automatically upgrading an operating system on a computer system, the method comprising:
    i) providing a first knowledge base, the first knowledge base including mappings from system states to sets of state modifications;
    ii) collecting data from the computer system to define the pre-upgrade system state;
    iii) querying the first knowledge base using the defined pre-upgrade system state, the query returning a first set of state modifications;
    iv) automatically modifying the computer system according to the returned set of state modifications;

v) running an operating system upgrade program and collecting a log from the upgrade program once the computer system has been modified according to the returned set of state modifications;

vi) testing whether the operating system upgrade completed successfully; and vii) if the operating system upgrade did not complete successfully, examining the collected log, updating the first knowledge base according to the log, and then returning to step 3 wherein the knowledge base queried is the updated first knowledge base.

2. The method of upgrading an operating system as claimed in claim 1, in which the step of querying the knowledge base uses a classification algorithm.

3. The method of upgrading an operating system as claimed in claim 2, in which the classification algorithm is an unsupervised classification algorithm.

4. The method of upgrading an operating system as claimed in claim 3, in which the classification algorithm is the k-nearest neighbours algorithm.

5. The method of upgrading an operating system as claimed in claim 1, in which a second knowledge base is provided, the second knowledge base including mappings of log templates to sets of state modifications.

6. The method of upgrading an operating system as claimed in claim 5, in which step 7 includes:

a) querying the second knowledge base with one or more log templates identified in collected log(s), the query returning a second set of state modifications;

b) comparing the second state of state modifications with the first set of state modifications; and c) if the second set of state modifications contains at least one state modification which is not in the first set of state modifications, adding to the first knowledge base a mapping from the defined system state to the union of the first and second sets of state modifications.

7. The method of upgrading an operating system as claimed in claim 6, in which the step of querying the second knowledge base uses a classification algorithm.

8. The method of upgrading an operating system as claimed in claim 7, in which the step of querying the second knowledge base uses an unsupervised classification algorithm.

9. The method of upgrading an operating system as claimed in claim 8, in which the step of querying the second knowledge base uses the k-nearest-neighbours algorithm.

10. The method of upgrading an operating system as claimed in claim 1, in which state modifications include configuration settings associated with the operating system upgrade program.

11. The method of upgrading an operating system as claimed in claim 1, further comprising the step of carrying out actions after step 5 and before step 6.

12. The method of upgrading an operating system as claimed in claim 11, in which the actions are defined according to the first set of state modifications, to undo the modifications carried out in step 4.

13. The method of upgrading an operating system as claimed in claim 11, in which the step of carrying out post-upgrade actions includes the steps of collecting data from the computer system after the OS upgrade program has been run to define a post-upgrade system state, comparing the post-upgrade system state with the pre-upgrade system state, and carrying out actions to return the system to the pre-upgrade system state.

14. The method of upgrading an operating system as claimed claim 1, in which a snapshot and rollback system is provided, and in which a snapshot of the system is taken before the upgrade program is run in step 5, and in which in the event of a failed upgrade, the system is rolled back to the snapshot state before the upgrade is attempted again.

15. The method of upgrading an operating system as claimed in claim 14, in which the snapshot is taken before the system is modified in step 4.

16. A non-transitory computer readable medium containing instructions which, when executed on a computer system, carries out the method of claim 1, the computer system having access to a first knowledge base, the knowledge base including mappings from system states to sets of state modifications.

17. The non-transitory computer readable medium as claimed in claim 16, further containing data comprising the first knowledge base.

18. A system of upgrading an operating system on a computer system, the system comprising one or more processing devices and one or more storage devices storing processor-executable instructions that, when executed by the one or more processing devices, causes the one or more processing to device to:

i) collect data from the computer system to define the pre-upgrade system state;

ii) query a knowledge base using the defined pre-upgrade system state, the query returning a set of state modifications, wherein the knowledge base includes mappings from system states to sets of state modifications;

iii) modify the computer system according to the returned set of state modifications;

iv) run an operating system upgrade program and collect a log from the upgrade program once the computer system has been modified;

v) test whether the operating system upgrade completed successfully; and vi) if the operating system upgrade did not complete successfully, examining the collected log, updating the knowledge base according to the log, and then returning to step 2 wherein the knowledge base queried is the updated knowledge base.

* * * * *